(12) United States Patent
Slike et al.

(10) Patent No.: US 8,944,018 B2
(45) Date of Patent: Feb. 3, 2015

(54) COOLING STRATEGY FOR ENGINE HEAD WITH INTEGRATED EXHAUST MANIFOLD

(71) Applicants: Jody Michael Slike, Farmington Hills, MI (US); Paul Thomas Reinhart, Livonia, MI (US); Timothy Gerald Taylor, Westland, MI (US); Todd Jay Brewer, Dearborn, MI (US)

(72) Inventors: Jody Michael Slike, Farmington Hills, MI (US); Paul Thomas Reinhart, Livonia, MI (US); Timothy Gerald Taylor, Westland, MI (US); Todd Jay Brewer, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 55 days.

(21) Appl. No.: 13/777,109

(22) Filed: Feb. 26, 2013

(65) Prior Publication Data

US 2013/0340692 A1    Dec. 26, 2013

Related U.S. Application Data

(63) Continuation-in-part of application No. 12/835,988, filed on Jul. 14, 2010, now Pat. No. 8,584,628, and a continuation-in-part of application No. 12/857,349, filed on Aug. 16, 2010.

(51) Int. Cl.
| | |
|---|---|
| *F02F 1/36* | (2006.01) |
| *F01P 9/00* | (2006.01) |
| *F01N 13/10* | (2010.01) |
| *F02F 1/24* | (2006.01) |
| *F02F 1/40* | (2006.01) |
| *F01N 3/04* | (2006.01) |
| *F02B 39/00* | (2006.01) |
| *F02B 67/10* | (2006.01) |
| *F01P 3/02* | (2006.01) |

(52) U.S. Cl.
CPC ............... *F01P 9/00* (2013.01); *F01N 13/105* (2013.01); *F02F 1/243* (2013.01); *F02F 1/40* (2013.01); *F01N 3/046* (2013.01); *F02B 39/005* (2013.01); *F02B 67/10* (2013.01); *F01P 2003/028* (2013.01)
USPC .................... 123/41.82 R; 60/321; 29/888.01

(58) Field of Classification Search
CPC ............... F02F 1/243; F02F 1/40; F02F 1/02; F01N 3/046; F01N 13/10; F01P 2003/024
USPC .............. 123/41.82 R, 41.82 A; 60/320, 321; 29/888.01
See application file for complete search history.

(56) References Cited

U.S. PATENT DOCUMENTS

| | | |
|---|---|---|
| 2,727,355 A | 12/1955 | Wosika |
| 3,488,723 A | 1/1970 | Veazie |
| 3,744,463 A | 7/1973 | McFarland, Jr. |
| 4,759,181 A | 7/1988 | Biritz |

(Continued)

FOREIGN PATENT DOCUMENTS

WO    2009093120 A1    7/2009

*Primary Examiner* — Noah Kamen
(74) *Attorney, Agent, or Firm* — James Dottavio; Alleman Hall McCoy Russell & Tuttle LLP (57) ABSTRACT

A cooling apparatus for an integrated exhaust manifold includes: a first cooling jacket configured to surround a portion of an exhaust manifold; and a second cooling jacket configured to surround another portion of the exhaust manifold. The first cooling jacket includes a first portion sitting atop the second cooling jacket and a second portion adjacent the second cooling jacket and positioned lower than the first portion.

17 Claims, 8 Drawing Sheets

(56) References Cited

U.S. PATENT DOCUMENTS

| | | | |
|---|---|---|---|
| 4,800,720 A | 1/1989 | Okada | |
| 4,860,700 A | 8/1989 | Smith | |
| 5,255,636 A * | 10/1993 | Evans | 123/41.54 |
| 5,279,266 A | 1/1994 | Landfahrer et al. | |
| 6,295,963 B1 | 10/2001 | Kollock et al. | |
| 6,513,506 B1 | 2/2003 | Ito et al. | |
| 6,672,296 B2 | 1/2004 | Ito et al. | |
| 7,051,685 B2 * | 5/2006 | Hayman et al. | 123/41.82 R |
| 7,367,294 B2 | 5/2008 | Rozario et al. | |
| 8,061,131 B2 * | 11/2011 | Kuhlbach | 60/323 |
| 8,100,117 B2 | 1/2012 | Riegger | |
| 8,146,543 B2 * | 4/2012 | Kuhlbach et al. | 123/41.82 R |
| 8,146,544 B2 * | 4/2012 | Lopez-Crevillen et al. | 123/41.82 R |
| 2003/0000211 A1 | 1/2003 | Drangel et al. | |
| 2004/0040521 A1 | 3/2004 | Hardin | |
| 2005/0193966 A1 | 9/2005 | Mac Vicar et al. | |
| 2007/0215074 A1 | 9/2007 | Rozario et al. | |
| 2009/0126659 A1 | 5/2009 | Lester et al. | |
| 2009/0319161 A1 | 12/2009 | Abendroth | |
| 2010/0037595 A1 | 2/2010 | Kaneko et al. | |
| 2010/0276030 A1 | 11/2010 | Py | |
| 2011/0238284 A1 | 9/2011 | Bollig et al. | |
| 2012/0001207 A1 | 1/2012 | Lee et al. | |
| 2012/0012073 A1 | 1/2012 | Brewer et al. | |
| 2012/0037101 A1 | 2/2012 | Riegger et al. | |

* cited by examiner

COOLING STRATEGY FOR ENGINE HEAD WITH INTEGRATED EXHAUST MANIFOLD

CROSS REFERENCE TO RELATED APPLICATIONS

This application is a continuation-in-part of U.S. patent application Ser. No. 12/835,988 titled "Engine with Cylinder Head Cooling" filed Jul. 14, 2010 and is a continuation-in-part of U.S. patent application Ser. No. 12/857,349 titled "Integrated Exhaust Manifold" filed Aug. 16, 2010, the entire contents of each of which are incorporated herein by reference for all purposes.

TECHNICAL FIELD

The present disclosure relates to cooling apparatuses for an integrated exhaust manifold for a vehicle internal combustion engine.

BACKGROUND

Modern vehicles include internal combustion engines that can see hotter temperatures during operation. Cooling strategies for the internal combustion engine include directing a coolant, such as water, between a cylinder head and a cylinder block. One hot spot for the engine is the exhaust manifold. Some cooling strategies include an integrated exhaust manifold (or "IEM"). Implementation of an IEM allows for an exhaust port profile to be integrated and cast into the cylinder head. IEMs, however, place additional thermal loads on the cylinder head as IEMs require improved thermal boundary control to maintain desired temperatures. In past designs IEMs have been encased with a cooling jacket running against an upper and lower surface of the IEM. Still there is room for improved cooling strategies.

One possible option for improved cooling is to reverse flow direction through the engine. Reverse flow cooling designs, however, typically yield poorer overall coolant flow; misguided flow of coolant to areas of the cooling jacket; and slower coolant flow rates. The reverse flow cooling typically does not allow for metered coolant flow from an engine block since gasket holes in the head are not designed to direct coolant in two directions, i.e. to desired spots in the cylinder head and the block.

Therefore, it is desirable to have an improved cooling strategy for an IEM.

SUMMARY

The present disclosure addresses one or more of the above-mentioned issues. Other features and/or advantages will become apparent from the description which follows.

One advantage of the present disclosure is that it provides have an improved cooling strategy for an IEM. Metered flow lines between separate cooling jackets for the IEM are provided. A reverse flow cooling strategy is also successfully implemented with the presently disclosed design as cooling jackets are configured with cooling lines to facilitate fluid flow from a bottom jacket to a top jacket.

One exemplary embodiment of the present disclosure relates to a cooling apparatus for an integrated exhaust manifold, having: a first cooling jacket configured to surround a portion of an exhaust manifold; and a second cooling jacket configured to surround another portion of the exhaust manifold. The first cooling jacket includes a first portion sitting atop the second cooling jacket and a second portion adjacent the second cooling jacket and positioned lower than the first portion.

Another exemplary embodiment of the present disclosure relates to a cooling system for an internal combustion engine with integrated exhaust manifold, including: a cylinder head assembly having: (i) a first cooling jacket configured to surround a portion of an exhaust manifold; (ii) a second cooling jacket configured to surround another portion of an exhaust manifold; and (iii) a plurality of cooling lines running between the first and second cooling jackets; and a pump fluidically connected to the cylinder head assembly.

Another exemplary embodiment of the present disclosure relates to a method of manufacturing a cooling system for an internal combustion engine with integrated exhaust manifold, including: forming a cylinder head assembly having a first cooling jacket and a second cooling jacket, at least partially surrounding the exhaust manifold; forming a plurality of cooling lines running between first and second cooling jackets; and connecting a pump to the first or second cooling jacket.

The invention will be explained in greater detail below by way of example with reference to the figures, in which the same reference numbers are used in the figures for identical or essentially identical elements. The above features and advantages and other features and advantages of the present teachings are readily apparent from the following detailed description of the best modes for carrying out the invention when taken in connection with the accompanying drawings. In the figures:

DETAILED DESCRIPTION

Referring to the drawings, wherein like characters represent examples of the same or corresponding parts throughout the several views, there is shown an exemplary, internal combustion engine with cylinder head cooling system. The cooling techniques disclosed herein include a multiple-part cooling apparatuses that runs a length of the cylinder head. One portion of a cooling apparatus encases a bottom of an IEM (or integrated exhaust manifold) and another portion of the cooling apparatus encases a top of the IEM. The top portion is tiered so as to sit at different heights with respect to a vertical axis of the vehicle. Coolant metering—particularly from the lower portion to an upper portion of the cooling apparatus—is improved by the configuration of the cooling apparatus taught herein. A reverse cooling strategy is also implemented that enables greater coolant flow from the cylinder block to the cylinder head.

The two-piece cooling apparatus, which is a coolant jacket as illustrated herewith, implements a series of advantages including desired global and localized coolant flow thus yielding target flow velocities and heat transfer coefficients for the jackets. Specifically, a target upper to lower cooling jacket flow control window is achieved. Also, proper control and balance of coolant flow to each individually cast coolant jacket is achieved, which is useful for maintaining cylinder head temperatures.

The present teachings can be incorporated on any type of vehicle engine having an integrated exhaust manifold. An inline engine or v-type engine can be used. Also, alternative engine designs such as a gasoline, diesel, Wankel or Atkinson cycle engines can be used.

Figure 1:
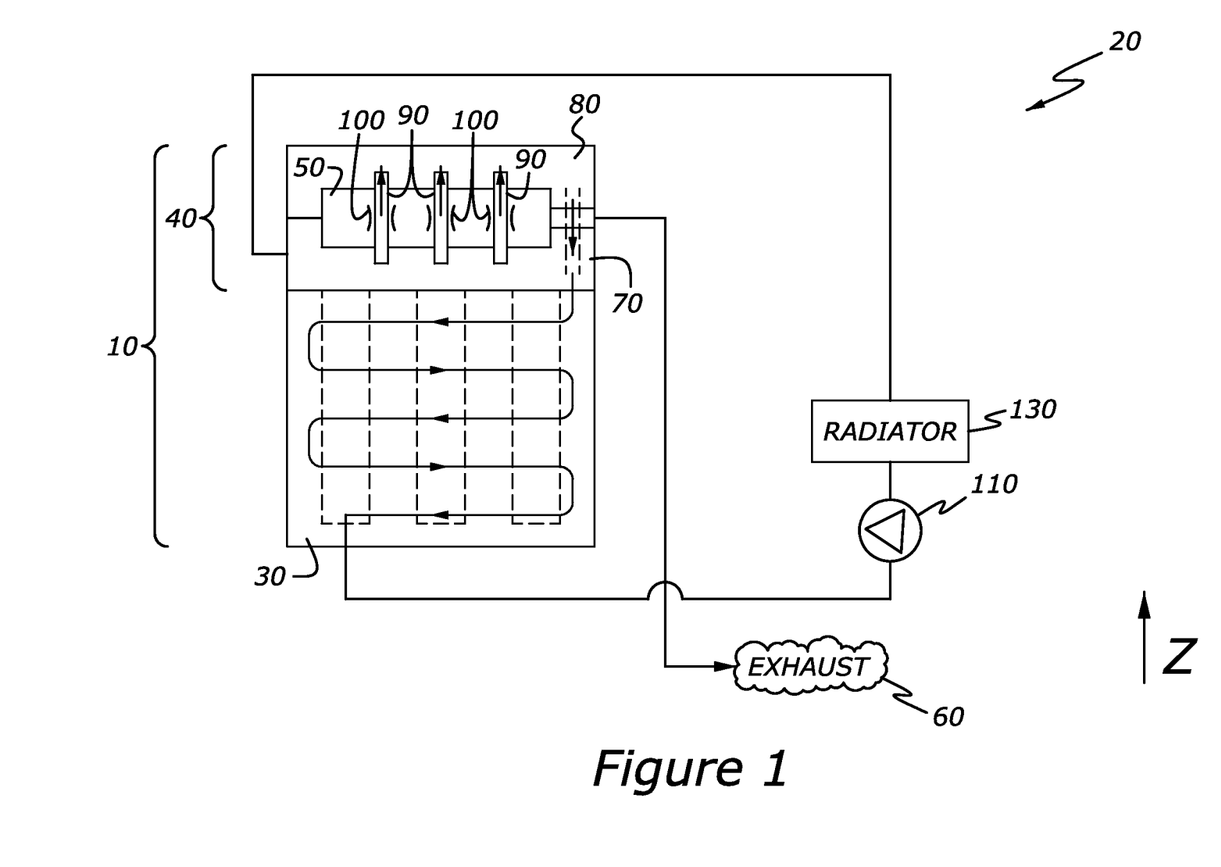
FIG. 1 is a schematic depiction of an exemplary internal combustion engine with integrated exhaust manifold and cooling system.

Referring now to FIG. 1, there is shown therein an internal combustion engine 10 with cooling system 20. The internal combustion engine 10 is an in-line three cylinder engine. Engine 10 is die cast and composed of an aluminum alloy. The engine 10 includes a cylinder block 30 and a cylinder head assembly 40 atop the block with respect to a vertical axis of the vehicle, labeled as the z-axis. The engine 10 includes an integrated exhaust manifold (IEM) 50 formed in the cylinder head assembly 40. IEM 50 guides engine exhaust 60 outside of a vehicle. IEM 50 is surrounded by a cooling apparatus that has multiple portions 70, 80. Portion 70 rests on a bottom side of the IEM 50. Portion 80 rests on a top side of the IEM 50. Cooling lines 90 extend between portions 70 and 80. Diverter ribs 100 are included proximate cooling lines 90, configured to increase coolant flow rate through lines.

Cooling apparatus portions 70, 80 are a part of a cooling system 20 configured to direct coolant through the engine 10. In this embodiment, the coolant is water ethylene glycol mixture but other coolants can be used. A pump 110 is included in the cooling system 20. A radiator 130 is also linked to pump 110. Pump 110 is configured to flow coolant in two directions, including a reverse flow from the block 30 to the cylinder head assembly 40, as shown in FIG. 1. Coolant, shown as the arrows labeled with "C", is directed from cylinder head assembly 40, through cylinder block 30 and into the radiator 130.

Figure 2:
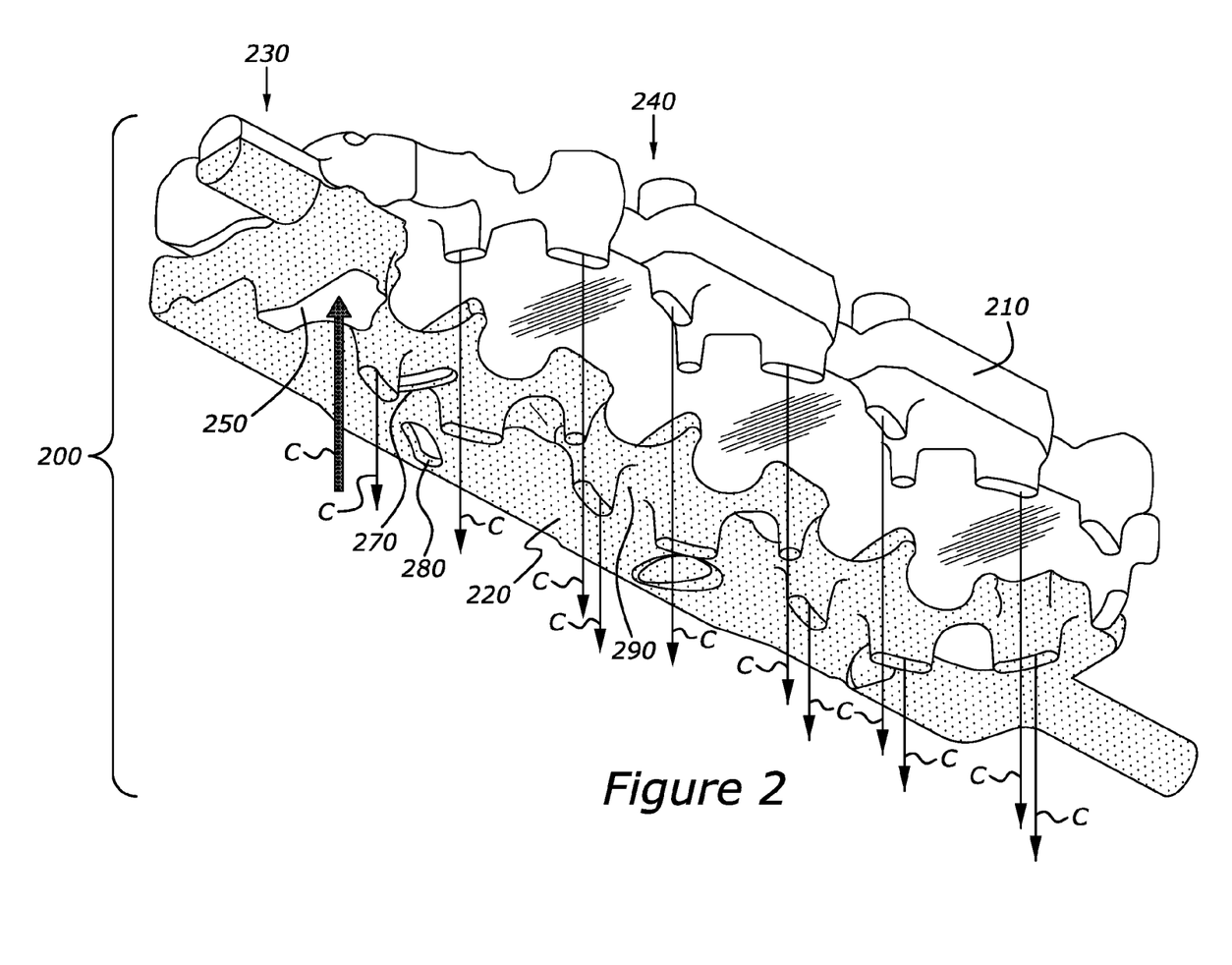
FIG. 2 is a bottom perspective view of a cooling apparatus.
Figure 3:
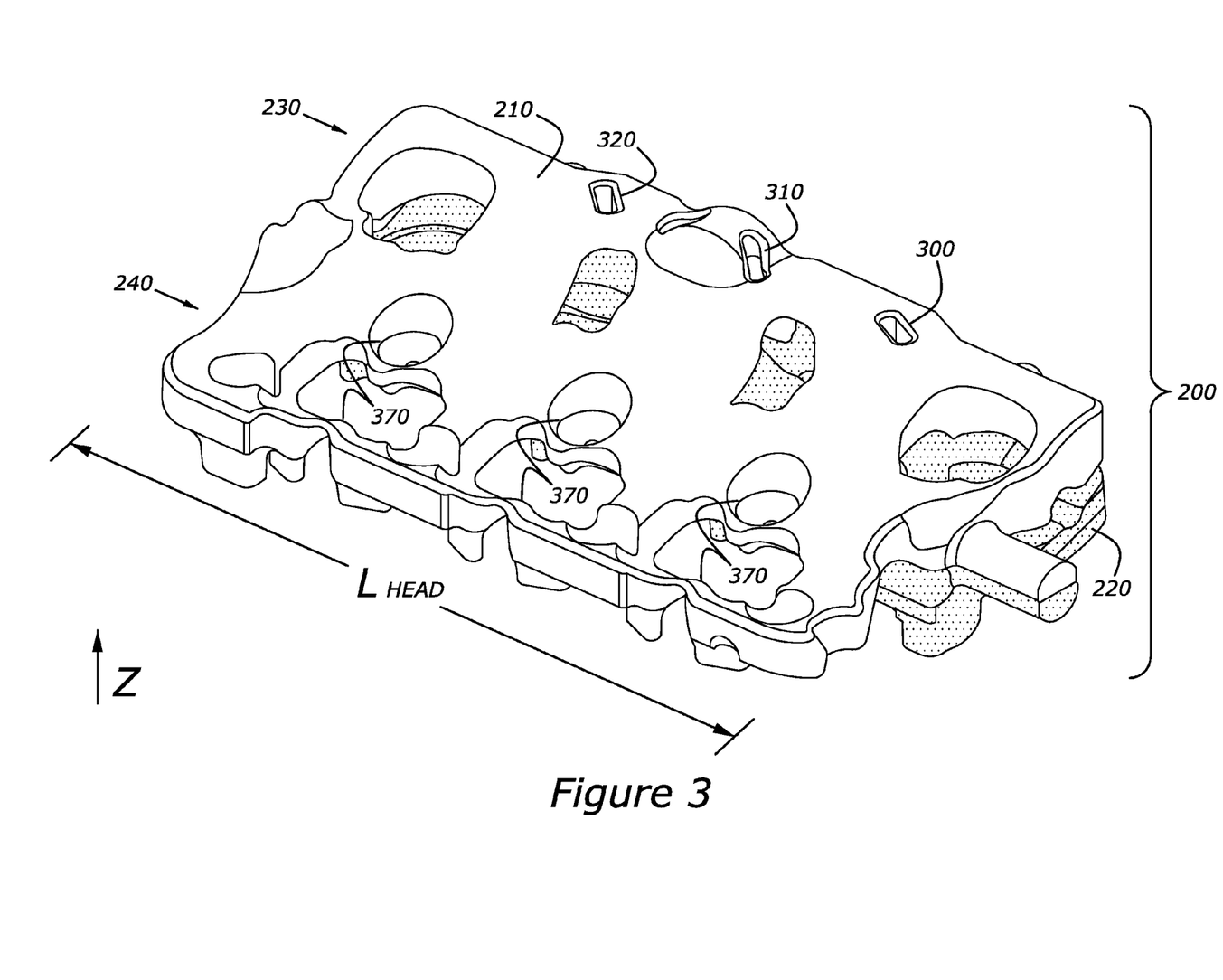
FIG. 3 is a top perspective view of the cooling apparatus of FIG. 2.
Figure 4:
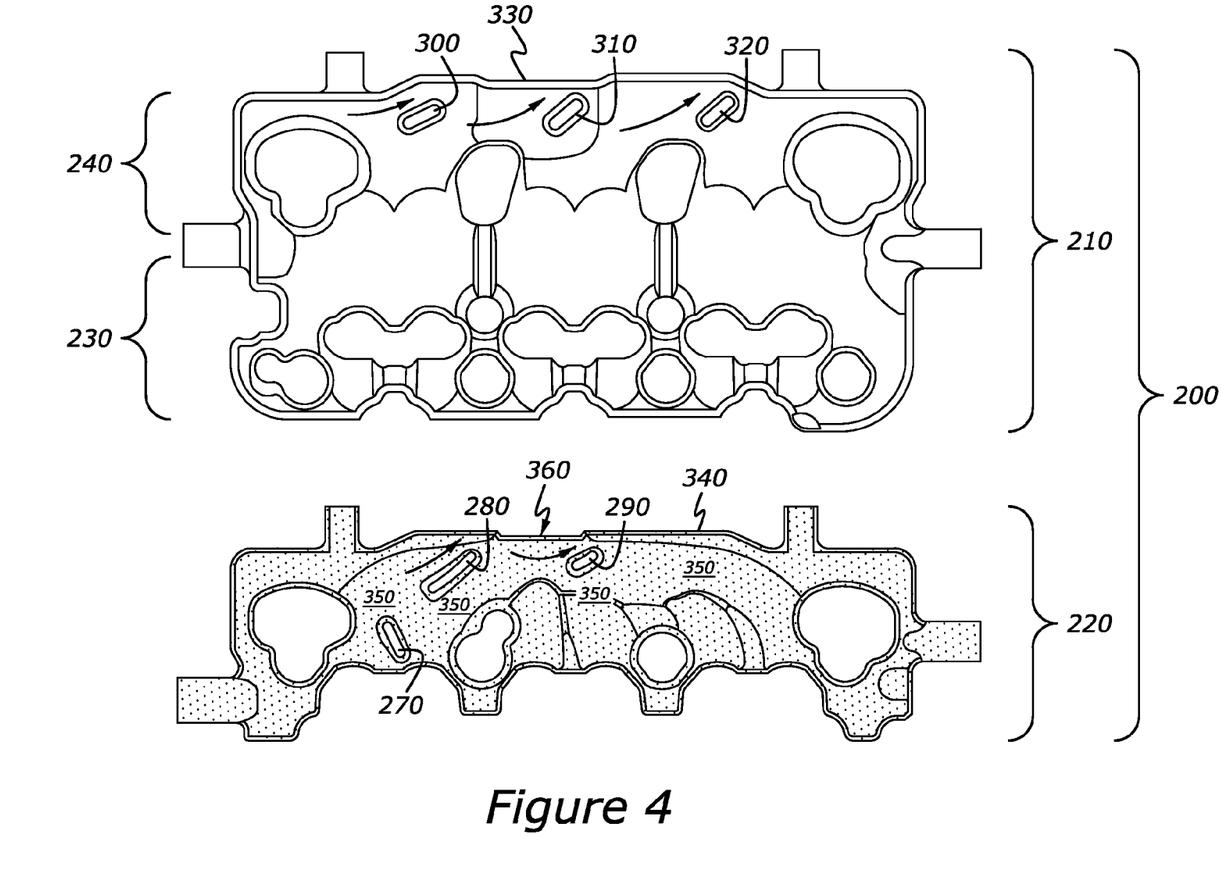
FIG. 4 are top and bottom views of portions of the cooling apparatus of FIG. 2 with coolant flow lines.
Figure 5:
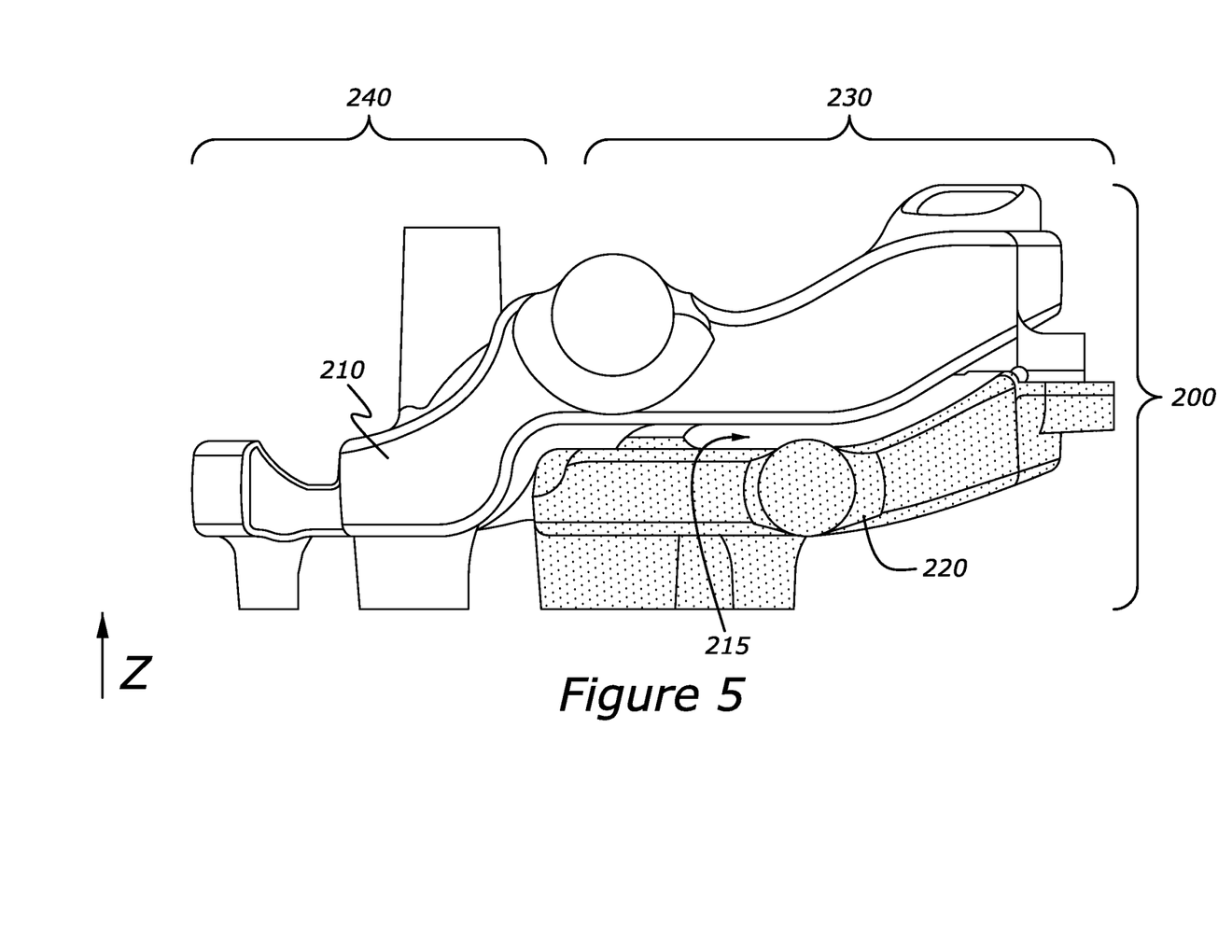
FIG. 5 is a side view of the cooling apparatus of FIG. 2.
Figure 6:
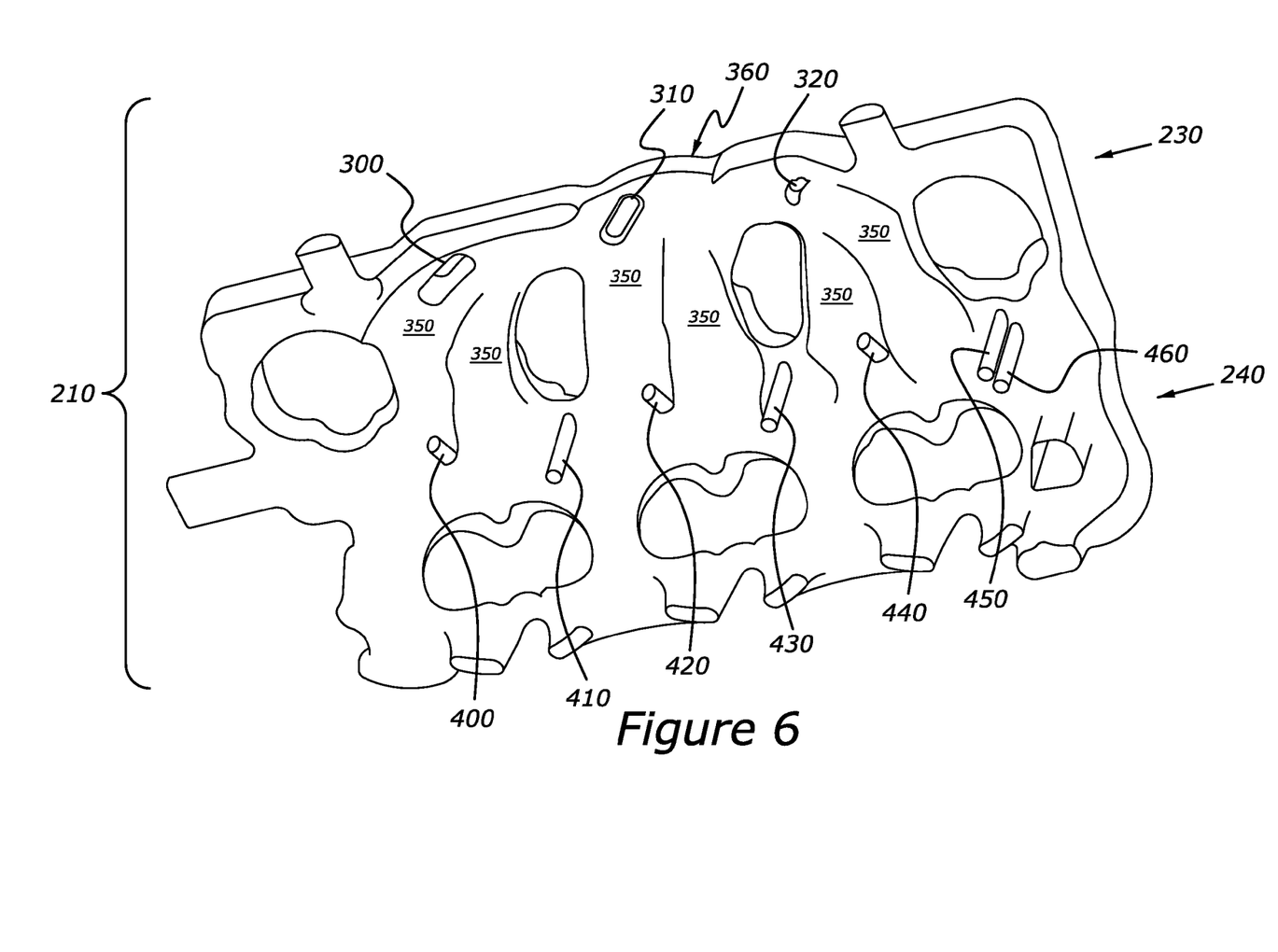
FIG. 6 is a bottom perspective view of a portion of the cooling apparatus of FIG. 2.
Figure 7:
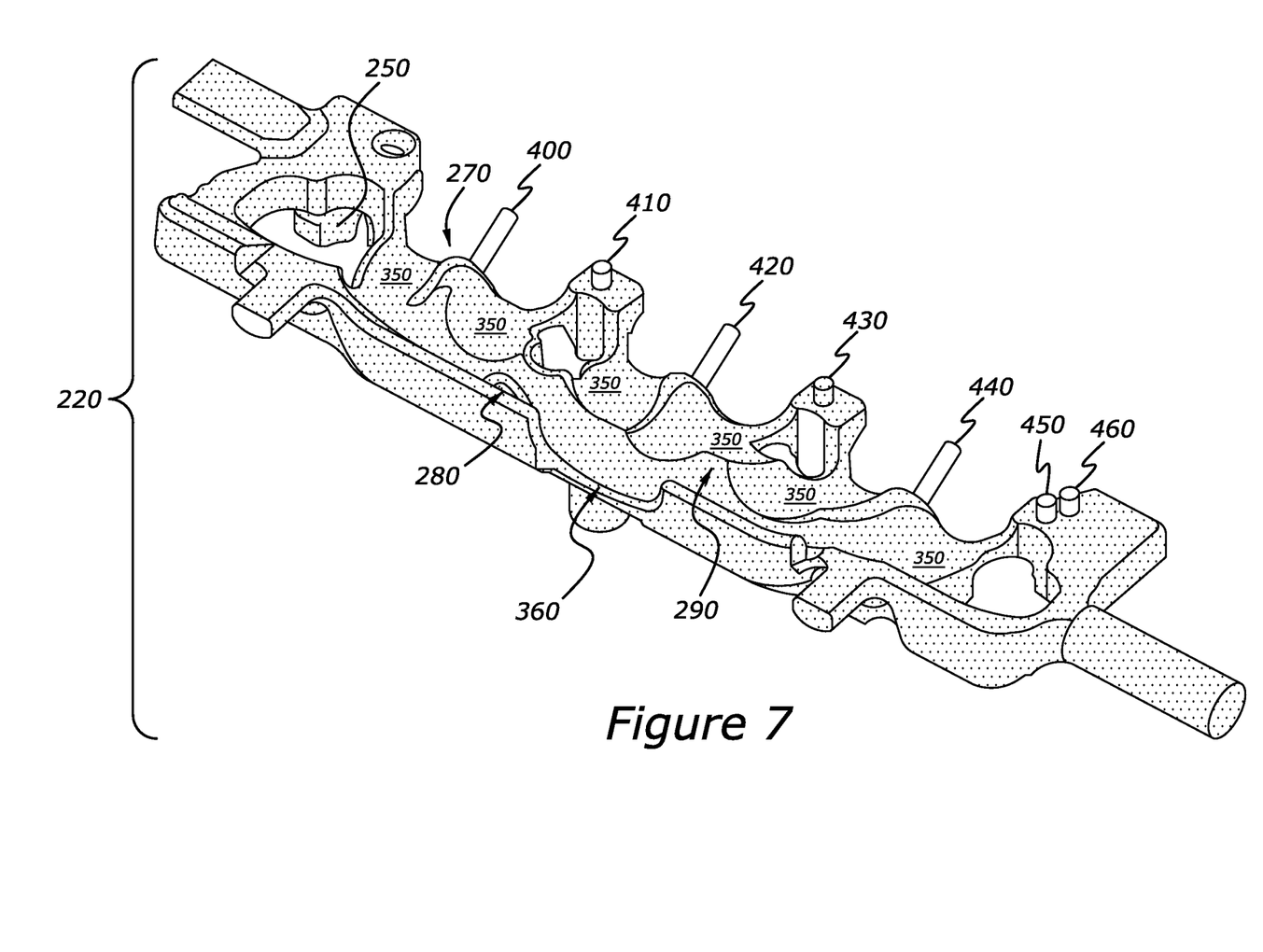
FIG. 7 is a top perspective view of another portion of the cooling apparatus of FIG. 2.
Figure 8:
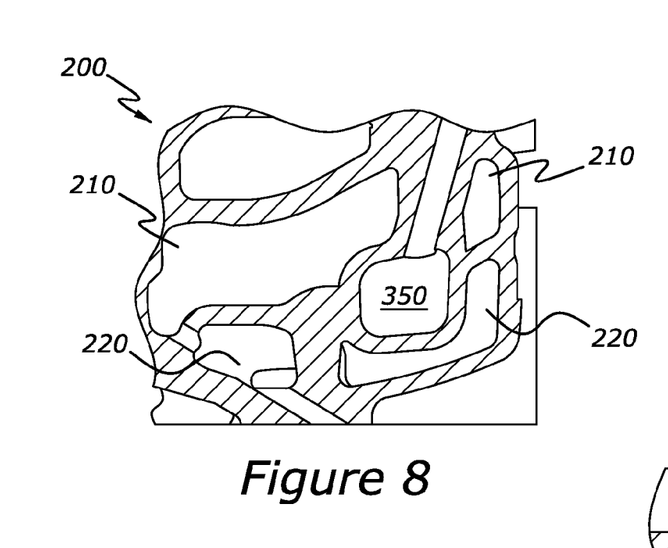
FIG. 8 is a cross-sectional view of the cooling apparatus of FIG. 2.
Figure 9:
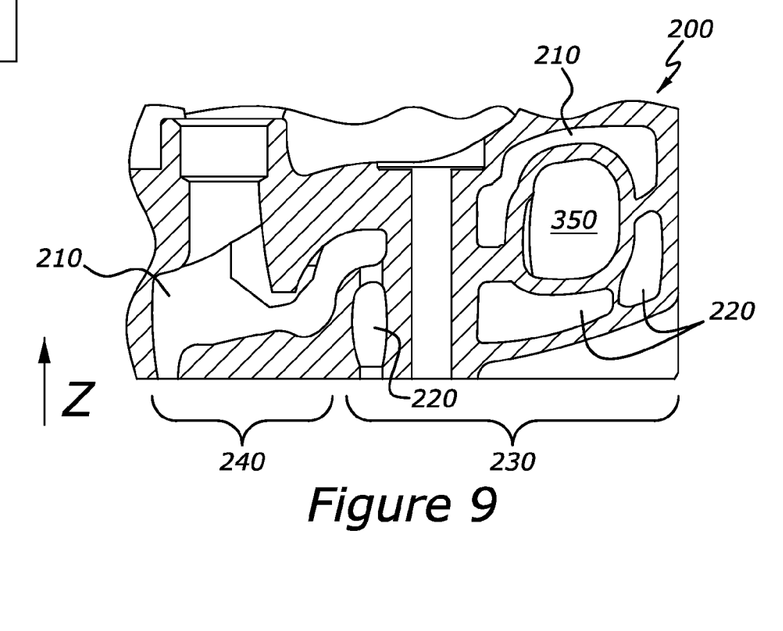
FIG. 9 is another cross-sectional view of the cooling apparatus of FIG. 2.

Referring now to FIGS. 2-9 there are shown therein different views of a cooling apparatus 200 compatible with the engine 10 and cooling system 20 of FIG. 1. FIG. 2 particularly illustrates a bottom perspective view of a multi-portion cooling apparatus 200. Cooling apparatus 200 includes two separately casted cooling jackets 210, 220 configured to surround an IEM, e.g., 350 as shown in FIGS. 8 and 9. Jackets 210, 220 are different cores separated by a cast wall that will be incorporated in the void 215, as shown in FIG. 5. Jackets 210, 220 are composed of an aluminum alloy. In other embodiments, jackets 210, 220 can be composed of alternative materials, e.g., steel, magnesium alloy or boron. Jackets 210, 220 can also be formed using techniques other than die casting, such as for example, stamping or milling.

Jacket 210 sits atop jacket 220 at a first portion 230 of jacket 210, as shown in FIG. 2 and is nested adjacent to jacket 220 at a second portion 240. Jacket 220 includes an inlet 250 through which coolant can enter into a cylinder head. From jacket 220 coolant runs into jacket 210 and flows through a plurality of passages and into the cylinder block (e.g., 30 as shown in FIG. 1). Coolant exits into the vehicle cooling system (e.g., into a radiator 130, as shown in FIG. 1).

A series of diverter ribs 270, 280, 290, 300, 310 and 320 are formed in jackets 210, 220 as shown in FIGS. 3-4 and 6-7.

Diverter ribs 270, 280, 290, 300, 310 and 320, in the illustrated exemplary embodiment, are configured to guide coolant toward an outer portion or wall 330, 340 of the jackets 210, 220, respectively as shown in FIG. 4. The outermost flow of coolant, as indicated by the arrows in FIG. 4, facilitates increased heat transfer along an edge of the IEM 350 and thus leads to greater cooling benefits. Ribs 270, 280, 290, 300, 310 and 320 are formed protrusions or walls extending through jackets to cause a disturbance or guidance of flow therein. Ribs 270, 280, 290, 300, 310 and 320 are located in each jacket 210 and 220, as shown. Diverter ribs 270, 280, 290, 300, 310 and 320 are positioned adjacent to an exhaust outlet 360 in manifold 350 to enable higher velocities adjacent to the exhaust or turbo outlet. Diverter ribs 270, 280, 290, 300, 310 and 320 direct a coolant flow longitudinally into an area of the jackets that would otherwise have slower coolant flow and higher thermal boundaries. Cup plugs, not shown, are used in the cylinder head assembly 200, configured to seal coolant in the assembly and define a controlled flow between ends of jackets 210, 220.

FIG. 3 shows the cooling apparatus 200 of FIG. 2 from a top perspective view. As shown each jacket 210, 220 is configured to run a length of the cylinder head, $L_{Head}$. Jacket 210 includes a number of functional thru holes, e.g., 370 as well. As it will be appreciated with reference to FIGS. 3 and 5, jacket 210 includes portion 230 and portion 240. Portion 230 of jacket 210 sits atop jacket 220 with respect to the z-axis. Portion 240 drops downward with respect to the z-axis and rests adjacent a side of jacket 220. Flow from jacket 220 to jacket 210 is facilitated in portion 240 of jacket 210 at least by the position of portion 240 relative to jacket 220.

In order to facilitate coolant distribution between jackets 210, 220, a series of cooling lines 400, 410, 420, 430, 440, 450 and 460 extend between jackets 210, 220, as shown and discussed with respect to FIGS. 6-9. Cooling lines that extend between jackets are shown in FIGS. 6 and 7. The plurality of cooling lines 400, 410, 420, 430, 440, 450 and 460 can be machined. In other embodiments, lines are cast with jacket castings. A bottom perspective view of the cooling lines 400, 410, 420, 430, 440, 450 and 460 extending from jacket 210 to jacket 220 is shown in FIG. 6. A casting is formed on an underside of jacket 210 in a shape of the exhaust manifold 350. Contours of jacket 210 are configured to surround an IEM 350. Coolant is routed to an outermost edge of jacket 210 via coolant lines 400, 410, 420, 430, 440, 450 and 460 and diverter ribs 300, 310, 320. Increased flow around IEM 350 is facilitated by diverter ribs 300, 310, 320. Coolant is also routed between exhaust ports of IEM 350 at least through cooling lines 400, 410, 420, 430, 440, 450 and 460, as shown.

Machined or drilled passages 400, 410, 420, 430, 440, 450 and 460 are positioned adjacent to the IEM 350, as shown in FIG. 6 for example. Cooling lines 400, 420, and 440 extend diagonally between jackets 210, 220. Cooling lines 410, 430, 450 and 460 extend vertically between jackets 210, 220. An exhaust bridge allows for increased flow in a region of the coolant jacket. Required target coolant flow and heat transfer coefficients are achieved in an area that is typically the highest thermally loaded area of the cylinder head, the exhaust outlet 360.

A top perspective view of the cooling lines 400, 410, 420, 430, 440, 450 and 460 extending from jacket 220 to jacket 210 is shown in FIG. 7. A casting is formed on topside of jacket 220 in the shape of the (integrated) exhaust manifold 350. Contours of jacket 220 are configured to surround an IEM 350. Coolant is routed to an outermost edge of jacket 220 also via cooling lines 400, 410, 420, 430, 440, 450 and 460 and diverter ribs 270, 280, 290. Increased flow around IEM 350 is facilitated by diverter ribs 270, 280, 290.

Turning now to FIG. 8, there is shown therein a cross-sectional view of the cooling apparatus 200 of FIG. 2. As shown, the IEM 350 is encased by jackets 210, 220. A cooling line, as also shown in FIGS. 6 and 7, extends diagonally between jackets 210, 220. In FIG. 9, a metered cooling line extends from jacket 220 to jacket 210. Metered cooling line extends vertically with respect to the z-axis between jackets 210, 220.

Methods of manufacturing a cooling system for an internal combustion engine with integrated exhaust manifold are also within the purview of the present disclosure. Using the present teachings, cooling benefits can be incorporated on any plurality of different engine designs. One method of manufacturing includes the following steps: (i) forming a cylinder head assembly having a first cooling jacket and a second cooling jacket, at least partially surrounding the exhaust manifold; (ii) forming a plurality of cooling lines running between the first and second cooling jackets; and (iii) connecting a pump to the first or second cooling jacket, e.g., as shown and discussed with respect to FIGS. 1-9.

In one embodiment, jackets are formed via a die cast process. Cavities designated for the coolant jackets are formed by sand cores. Connections between cores and/or the steel die or mold are commonly referred to as "core prints." Cylinders of sand are fit into holes in sides of the mold thus assisting in the positioning of the sand cores or molds.

In one embodiment, the method further includes forming the first cooling jacket to include a first portion sitting atop the second cooling jacket; and forming the first cooling jacket to include a second portion adjacent the second cooling jacket and positioned lower than the first portion so that a cooling line formed in the second portion of the first cooling jacket meters coolant from the lower cooling jacket to the upper cooling jacket (as shown in FIG. 5, for example).

The method can also include forming a second portion of the first cooling jacket to run a length of the cylinder head; and forming the second jacket to run a length of a cylinder head, for example as shown in FIG. 3. In another embodiment, the method includes forming diverter ribs in the first or second cooling jacket configured to guide coolant toward an outer portion of the first or second cooling jacket.

In one embodiment, the method includes configuring the pump to flow coolant to the first cooling jacket, e.g., as shown in FIG. 1. The method also includes configuring the first cooling jacket to flow coolant to the second cooling jacket and configuring the second cooling jacket to flow coolant into an engine block, which is also shown in FIG. 1.

Forming a metered cooling line configured to meter coolant from the lower cooling jacket to the upper cooling jacket is further performed in another embodiment of the method, e.g., as shown in FIG. 9. Metered cooling lines can be die cast or drilled into the cylinder head assembly.

Those familiar with the art to which this invention relates will recognize various alternative designs and embodiments for practicing the invention within the scope of the appended claims.

We claim:

1. A cooling apparatus for an integrated exhaust manifold, comprising:
    a first cooling jacket surrounding a portion of an exhaust manifold;
    a second cooling jacket surrounding another portion of the exhaust manifold;
    the first cooling jacket including a first portion sitting atop the second cooling jacket and a second portion adjacent the second cooling jacket and positioned lower than the first portion; and
    a plurality of cooling lines running between the first and second cooling jackets.

2. The cooling apparatus of claim 1, wherein one of the plurality of cooling lines is a metered cooling line, configured to meter coolant from the second cooling jacket to the first cooling jacket.

3. The cooling apparatus of claim 2, further comprising:
    a diverter rib formed in the first or second cooling jacket.

4. The cooling apparatus of claim 3, wherein the diverter rib is configured to guide coolant toward an outer portion of the first or second cooling jacket.

5. A cooling system for an internal combustion engine with an integrated exhaust manifold, comprising:
    a cylinder head assembly having:
        (i) a first cooling jacket configured to surround a portion of an exhaust manifold;
        (ii) a second cooling jacket configured to surround another portion of an exhaust manifold; and
        (iii) a plurality of cooling lines running between the first and second cooling jackets; and
    a pump fluidically connected to the cylinder head assembly, wherein the cooling system is configured to flow coolant from the first cooling jacket to the second cooling jacket and into an engine block.

6. The cooling system of claim 5, wherein the first cooling jacket includes a first portion sitting atop the second cooling jacket and a second portion adjacent the second cooling jacket and positioned lower than the first portion so that a cooling line formed in the second portion of the first cooling jacket meters coolant from the lower cooling jacket to the upper cooling jacket.

7. The cooling system of claim 6, wherein the second portion of the first cooling jacket and the second jacket runs a length of a cylinder head.

8. The cooling system of claim 5, further comprising:
    a diverter rib formed in the first or second cooling jacket.

9. The cooling system of claim 8, wherein the diverter rib is configured to guide coolant toward an outer portion of the first or second cooling jacket.

10. The cooling system of claim 5, wherein the first and second cooling jackets are separate castings.

11. The cooling system of claim 5, wherein the cooling lines are machined passages.

12. A method of manufacturing a cooling system for an internal combustion engine with an integrated exhaust manifold, comprising:
    forming a cylinder head assembly having a first cooling jacket and a second cooling jacket, at least partially surrounding the exhaust manifold;
    forming a plurality of cooling lines running between the first and second cooling jackets;
    connecting a pump to the first or second cooling jacket;
    forming the first cooling jacket to include a first portion sitting atop the second cooling jacket; and
    forming the first cooling jacket to include a second portion adjacent the second cooling jacket and positioned lower than the first portion so that a cooling line formed in the second portion of the first cooling jacket meters coolant from the lower cooling jacket to the upper cooling jacket.

13. The method of claim 12, further comprising:
    forming a second portion of the first cooling jacket to run a length of the cylinder head; and forming the second jacket to run the length of the cylinder head.

14. The method of claim 12, further comprising:
forming diverter ribs in the first or second cooling jacket configured to guide coolant toward an outer portion of the first or second cooling jacket.

15. The method of claim 12, further comprising:
configuring the pump to flow coolant to the first cooling jacket;
configuring the first cooling jacket to flow coolant to the second cooling jacket; and
configuring the second cooling jacket to flow coolant into an engine block.

16. The method of claim 12, further comprising:
forming a metered cooling line configured to meter coolant from the lower cooling jacket to the upper cooling jacket.

17. The method of claim 12, wherein forming a plurality of cooling lines includes machining the cooling lines.

\* \* \* \* \*